(12) United States Patent
Mendel et al.

(10) Patent No.: US 12,215,767 B2
(45) Date of Patent: Feb. 4, 2025

(54) ROTARY BEARING AND GEARBOX

(71) Applicant: Harmonic Drive SE, Limburg an der Lahn (DE)

(72) Inventors: Matthias Mendel, Limburg an der Lahn (DE); Alexander Schäfer, Elbtal-Elbgrund (DE); Michael Schaffer, Niederbrechen (DE)

(73) Assignee: Harmonic Drive SE, Limburg an der Lahn (DE)

( * ) Notice: Subject to any disclaimer, the term of this patent is extended or adjusted under 35 U.S.C. 154(b) by 198 days.

(21) Appl. No.: 17/907,719

(22) PCT Filed: Mar. 31, 2021

(86) PCT No.: PCT/EP2021/058443
§ 371 (c)(1),
(2) Date: Sep. 29, 2022

(87) PCT Pub. No.: WO2021/204624
PCT Pub. Date: Oct. 14, 2021

(65) Prior Publication Data
US 2023/0130289 A1   Apr. 27, 2023

(30) Foreign Application Priority Data
Apr. 7, 2020   (DE) .......................... 102020109646.1

(51) Int. Cl.
*F16H 49/00*   (2006.01)
*F16C 19/16*   (2006.01)
*F16C 33/58*   (2006.01)

(52) U.S. Cl.
CPC ........... *F16H 49/001* (2013.01); *F16C 19/16* (2013.01); *F16C 33/58* (2013.01); *F16C 2361/61* (2013.01); *F16H 2049/003* (2013.01)

(58) Field of Classification Search
CPC .. F16H 49/001; F16H 2049/003; F16C 19/16; F16C 33/58; F16C 2361/61; F16C 43/06
See application file for complete search history.

(56) References Cited

U.S. PATENT DOCUMENTS

| | | |
|---|---|---|
| 1,212,253 A | 1/1917 | Perkins |
| 3,995,919 A | 12/1976 | Boeck |

(Continued)

FOREIGN PATENT DOCUMENTS

| | | |
|---|---|---|
| AT | 129151 B | 7/1932 |
| CH | 38509 A | 12/1906 |

(Continued)

*Primary Examiner* — Zakaria Elahmadi
(74) *Attorney, Agent, or Firm* — Rogowski Law LLC

(57) ABSTRACT

A rotary bearing (50), especially for harmonic gearing, comprising an outer bearing ring (1b) and an inner bearing ring (1a) arranged therein; whereby the inner bearing ring (1a) and the outer bearing ring (1b) are each provided with at least one receptacle (10, 11) through which, when the two receptacles (10, 11) are in a corresponding position with respect to one another, rolling elements (8) can be inserted through a receptacle opening (22) formed by the two receptacles (10, 11) into an anti-friction bearing between the bearing surface (7) of the inner bearing ring (1a) and the bearing surface (9) of the outer bearing ring (1b), wherein a guide ring (20) for the rolling elements (8) is arranged in at least one of the two receptacles (10, 11) between the receptacle opening (22) and the rolling elements (8).

15 Claims, 6 Drawing Sheets

(56) References Cited

U.S. PATENT DOCUMENTS

| | | | |
|---|---|---|---|
| 10,823,278 B2 * | 11/2020 | Tezuka | F16H 1/32 |
| 10,876,614 B2 * | 12/2020 | Mendel | F16C 33/581 |
| 2013/0121629 A1 * | 5/2013 | Takada | G01P 1/026 |
| | | | 384/448 |
| 2018/0051789 A1 * | 2/2018 | Mendel | F16C 43/06 |
| 2020/0003288 A1 * | 1/2020 | Mendel | F16H 49/001 |

FOREIGN PATENT DOCUMENTS

| | | | | |
|---|---|---|---|---|
| DE | 518257 C | 2/1931 | | |
| DE | 8426143 U1 | 4/1985 | | |
| DE | 102015104308 A1 | 9/2016 | | |
| DE | 102016201050 A1 * | 1/2017 | | F16C 35/042 |
| FR | 2279971 A1 | 2/1976 | | |
| WO | WO-2016150844 A1 * | 9/2016 | | F16C 33/581 |

* cited by examiner

ROTARY BEARING AND GEARBOX

CROSS-REFERENCE TO RELATED APPLICATIONS

This application is a national stage application (under 35 USC § 371) of PCT/EP2021/058443, filed Mar. 31, 2021, which claims benefit of DE 102020109646.1, filed Apr. 7, 2020, the contents of each of which is incorporated by reference herein.

BACKGROUND OF THE INVENTION

Technical Field and State of the Art

The invention relates to a rotary bearing and a gearbox.

Such rotary bearings are particularly suitable for mounting strain wave gears, whereby the rotary bearing and the strain wave gearing form a gearbox. Such gearboxes are employed in a wide array of applications in numerous technical fields. Such gearboxes find widespread use especially in robotics as well as in prosthetics. By way of an example, reference can be made here to the Harmonic Drives gearing, which belongs to the group of strain wave gear systems.

The input component, which is configured there as an elliptical wave generator, uses a ball bearing to deform the transmission component, which is configured as an externally toothed flexspline that, in the opposing areas of the major axis of the ellipse, engages with the internally toothed wheel configured as a circular spline. As the wave generator rotates, the major axis of the ellipse shifts its position and so does the engagement area of the teeth. Since the flexspline of the Harmonic Drive® gear as a rule has two fewer teeth than the circular spline, the flexspline moves relative to the circular spline by one tooth during a half rotation of the wave generator and by two teeth during a full rotation. In the case of a fixed circular spline, the flexspline, as the output element, rotates counter to the input. In this context, the circular spline can be arranged so that it can be secured to a bearing ring.

For purposes of executing a rotational movement between two components, such strain wave gears are placed onto a bearing ring, where they are mounted so as to be rotatable. Here, on the one hand, the wheel of the strain wave gear can be arranged non-rotatably relative to the bearing ring, whereby rolling elements are then arranged between bearing surfaces of the bearing ring and of the transmission component, as a result of which the rotatability of the strain wave gear relative to the bearing ring is ensured. On the other hand, the transmission component of the strain wave gear can also be arranged non-rotatably relative to the bearing ring, whereby rolling elements are then arranged between bearing surfaces of the bearing ring and of the wheel, as a result of which the rotatability of the strain wave gear relative to the bearing ring is likewise ensured.

Austrian patent AT 129 151 B discloses a single-row or multiple-row solid radial ball bearing. A guide ring with an angular cross section is placed onto the inner raceway or into the outer raceway.

U.S. Pat. No. 1,212,253 A discloses a roller bearing with two bearing rings and a guide ring for the rolling elements.

Swiss patent application CH 38 509 A describes a ball bearing with two rings arranged concentrically in each other and with a guide ring for the rolling elements.

German patent application DE 10 2015 104 308 A1 discloses that a rotary bearing of a gearing installation set of the type described above is configured in such a way that the wheel or the transmission component and the bearing ring are each provided with at least one receptacle through which, when the two receptacles are in a corresponding position with respect to each other, rolling elements can be inserted into an anti-friction bearing between the bearing surface of the wheel or of the transmission component and the bearing surface of the bearing ring.

A drawback of such a construction is that, when the output component rotates, the rolling elements could fall out of the inner space, thus impairing the function of the rotary bearing and blocking it.

Before this backdrop, it is an objective of the invention to appropriately improve a rotary bearing of the type described above. Moreover, an improved gearbox is to be put forward as well.

SUMMARY OF THE INVENTION

According to an embodiment of the invention, a guide ring for the rolling elements is arranged in at least one of the two receptacles between the receptacle opening and the rolling elements.

The invention is based on the consideration of absolutely preventing the rolling elements from falling out of the bearing. In particular, replacing the rotary bearing is very laborious when dealing with hard-to-access installation conditions. Moreover, faulty functioning and blockage of the bearing can give rise to hazardous situations.

It has now been recognized that it is possible to prevent the rolling elements from falling out by employing a guide ring that limits the movement of the rolling elements in the axial direction towards the receptacle opening.

The rotary bearing can preferably be designed as a four-point bearing. Such four-point bearings can be configured in a very compact form and can absorb not only purely axial and radial forces but also high tilting moments. This is particularly advantageous when mounting one of the strain wave gear systems described here.

In an advantageous manner, a sealing ring, particularly a rotary shaft seal, is arranged in at least one of the two receptacles, said seal blocking an axial movement of the guide ring in the direction of the receptacle opening. In certain application cases, it can happen that spent lubricant finds its way inside the gear system, for example, reaching the rotary bearing of the gear system, and penetrating through the bearing inner space present there. If necessary, an outer rotary shaft seal can be employed to seal off the inner space so as to prevent undesired materials from entering or else grease in the anti-friction bearing from escaping. At the same time, the rotary shaft seal can axially support the guide ring.

Preferably, a retaining ring is arranged in at least one of the two receptacles and it serves to block an axial movement of the guide ring in the direction of the receptacle opening. This allows a simple and cost-effective axial fixation of the guide ring employing standard mechanical engineering elements.

According to the invention, the guide ring is configured in the form of a screw having an external thread that engages with an internal thread formed in the outer bearing ring.

In a non-inventive embodiment, the guide ring is axially secured to the outer diameter in the outer bearing ring by means of a press fit (interference fit). This cost-effective fixation technique dispenses with the need to create threading, grooves and the like.

The guide ring is preferably made of plastic or steel. It is particularly low-cost if its is made of plastic.

In a non-inventive embodiment, the guide ring is configured so as to be integrated into a flat seal. With this design, it is possible to dispense with the separate component in the form of a seal and the manufacturing process of the rotary bearing is simplified. For instance, a metal ring that functions as a guide ring can be integrated into the flat seal made of elastomer.

Regarding the gearbox, the above-mentioned objective is achieved by a gear box having the features of claim 3.

The term gearbox refers here preferably to an open or closed housing which accommodates the gearing parts (gearwheels) on shafts, with bearing supports or seals.

Advantageously, the wheel or the circular spline forms the outer bearing ring. This translates into a versatile and compact gearbox.

In a preferred embodiment, the inner bearing ring is configured as a clutching wheel with internal teeth having the same number of teeth as the external teeth of the transmission component, whereby the internal teeth of the clutching wheel are engaged with the external teeth of the transmission component. This gear design allows an axially very compact design.

Additional objectives, advantages, features and application possibilities of the present invention ensue from the description below of an embodiment making reference to the drawing. In this context, all of the described and/or depicted features, either on their own or in any meaningful combination, constitute the subject matter of the present invention, also irrespective of their compilation in the claims or the claims to which they refer back.

DESCRIPTION OF THE DRAWINGS

The following is shown.

Identical parts are provided with the same reference numerals in all of the figures.

DETAILED DESCRIPTION

Figure 1:
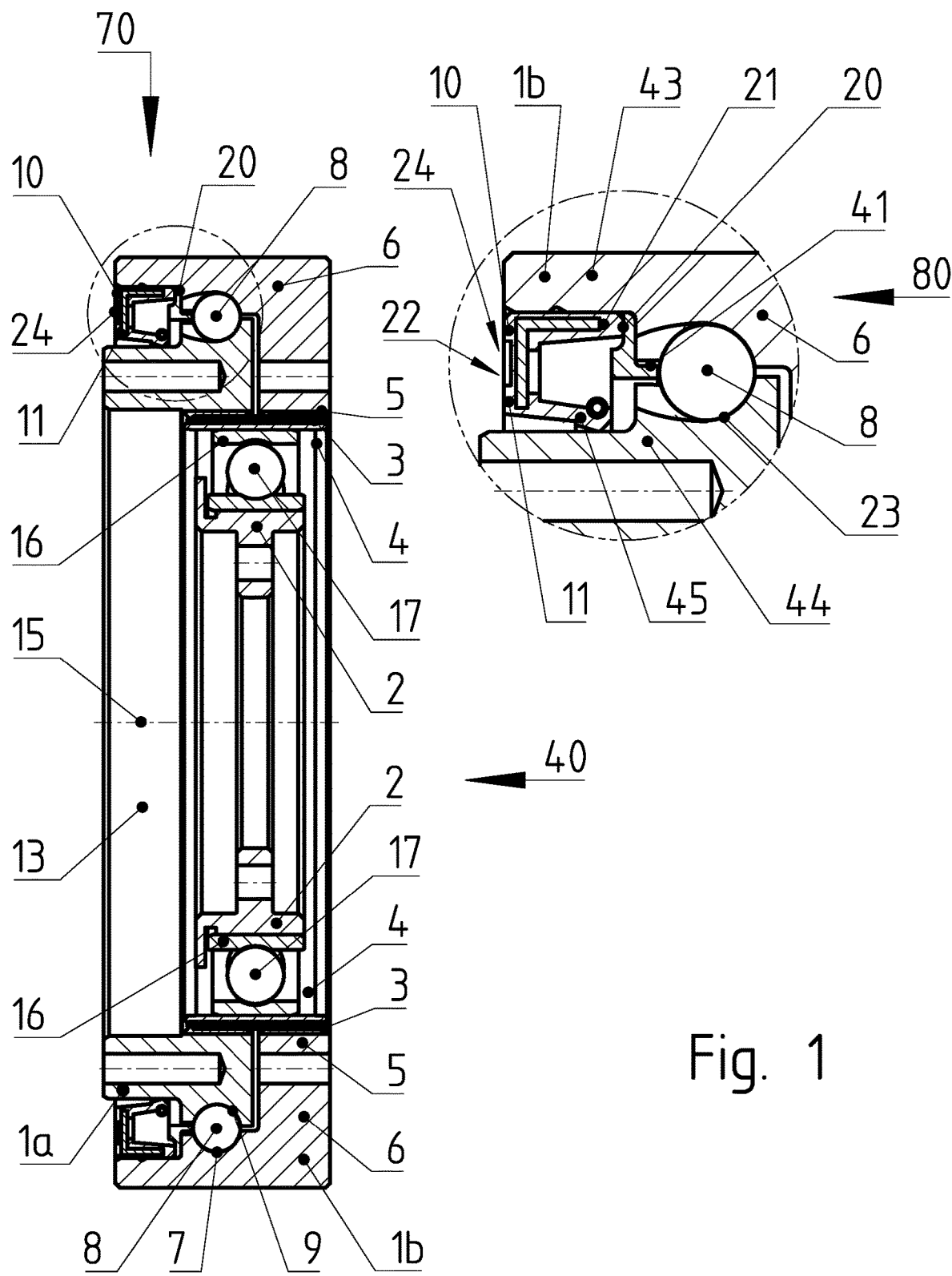
FIG. 1 a first preferred embodiment of a rotary bearing according to the invention that forms a gearbox and that has a strain wave gear mounted therein, in a sectional view.

FIG. 1 shows an embodiment of a first preferred embodiment of an inventive rotary bearing 50 and a strain wave gear 40 mounted therein, together forming a gearbox 70, shown in a mounted state in a sectional view. In this context, a transmission component 4 configured as a flexspline is placed onto an input component 2 that is configured as an elliptical wave generator and that is preferably mounted on a hollow shaft, wherein the transmission component 4 is likewise elliptically deformed by the elliptical input component 2. External teeth 3 of the elliptically deformed transmission component 4 engage in the opposing areas of the major axis of the ellipse with the internal teeth 5 of a wheel 6 configured as a circular spline.

The wheel 6 displays the greatest axial extension of all of the components of the gear box 70. In the embodiment described here, the input component 2 is configured as an elliptical wave generator. The elastic transmission component 4 configured as a flexspline is placed onto this input component 2 over a ball bearing 16 containing several balls 17. Due to the elasticity in the area of its external teeth 3, this transmission component 4 is likewise elliptically deformed owing to the elliptical shape of the input component 2.

Since the elastic transmission component 4 has external teeth 3 and is elliptically deformed, these external teeth 3 engage in the area of the major axis of the ellipse with the internal teeth 5 of the wheel 6 configured as a circular spline. This wheel 6 has an internal surface that is configured as a bearing surface 9 and that matches an external surface of an inner bearing ring 1a configured as a bearing surface 7. This inner bearing ring 1a has internal teeth having the same number of teeth as the transmission component 4, thus having the function of a clutch (without speed reduction).

In this context, an anti-friction bearing having several rolling elements 8 is arranged between these two bearing surfaces 7 and 9 of the wheel 6 and of the inner bearing ring 1a, wherein these two bearing surfaces 7 and 9 of the wheel 6 and of the inner bearing ring 1a are configured as raceways 12 for the rolling elements 8 of the anti-friction bearing. The wheel 6 is an outer bearing ring 1b of the rotary bearing 50.

In order to attain a very narrow and compact design for the gearbox 70, a receptacle 10 in inserted into the bearing surface 7 of the wheel 6 or of the outer bearing ring 1b, and a receptacle 11 is inserted into the bearing surface 9 of the inner bearing ring 1a. In this context, both receptacles 10 and 11 correspond in such a way that, at an appropriate orientation relative to each other, they form a loading channel 24 having a receptacle opening 22 and can accommodate a rolling element with a positive fit. Thanks to this positive-fit accommodation of a rolling element 8, the anti-friction bearing can be filled between the wheel 6 and the bearing ring 1 with rolling elements 8 via the loading channel 24, so that the wheel 6 can be supported relative to the bearing ring 1a without backlash, and the bearing ring 1a and the wheel 6 can be rotated relative to each other. In this position, it is then possible, by means of the input component 2 configured as a wave generator, to drive the transmission component 4 configured as a flexspline, so that there is a relative movement between the wheel 6 and the transmission component 2. In the present embodiment, the rolling elements 8 are configured as balls.

The flexspline or the transmission component 4 engages with the wheel 6 or with the circular spline and also engages with a clutching wheel 13 or with a dynamic spline, wherein the clutching wheel is identical to the bearing ring 1a which has internal teeth. The clutching wheel 13 has internal teeth having the same number of teeth as the external teeth 3 of the transmission component 4. In this manner, the clutching wheel 13 functions as a clutch without a speed reduction ratio.

The components of the gearbox 70, namely, the inner bearing ring 1a, the input component 2, the transmission component 4 and the wheel 6 are coaxially arranged around an x-axis 15 of the gearbox 70. Thanks to the positive-fit configuration of the rolling elements 8 and of the receptacles 10 and 11 of the wheel 6 and of the inner bearing ring 1a, it is now possible to put forward a gearbox 70 which is very compact and narrow in the axial direction and which is especially used when there is very little installation space for the execution of rotational movements, as is the case in many applications in robotics and prosthetics, which translates into a simple installation assembly of the gearbox 70.

The rotary bearing 50 is optimized in terms of a high degree of reliability and service life. For purposes of preventing the rolling elements 8 from falling out of the loading channel 24 or out of the receptacles 10, 11, a guide ring 20 is arranged in the receptacle 10 of the bearing ring 1b. Receptacles 10, 11 are likewise present in the embodiments of the rotary bearing according to FIGS. 5 and 6.

The guide ring 20, the receptacles 10, 11 and the loading channel 24 are depicted in FIG. 1 in an enlarged view 80. In the axial direction between the guide ring 20 and the receptacle opening 22, a rotary shaft seal 21 is arranged in the loading channel 24 in order to prevent axial movement of the guide ring 20 in the direction of the receptacle opening 22. The guide ring 20 has an annular projection 41 that runs axially and that comes into contact with the rolling elements 8. The projection 41 preferably has a small contact surface which the rolling elements 8 touch during operation of the rolling elements 8 in order to keep the friction between the guide ring 20 and the rolling elements 8 to a minimum.

The rotary shaft seal, which is configured as a rotary shaft sealing ring, supports itself radially outside on a shoulder 43 inside the outer bearing ring 1b and, on the opposite side, its sealing edge 45 rests on and seals a lateral surface—configured as a sealing surface 44—of the inner bearing ring 1a.

In this manner, the guide ring 20 holds the rolling elements 8 in an annular gap 23 and prevents their falling out of the loading channel 24, even if the rotary bearing 50 is moved or rotated, so that even if the loading channel 24 has a perpendicular orientation downwards, the rolling elements 8 do not fall out of the annular cavity 23. The guide ring 20 here is preferably made of plastic (inexpensive) or else of steel.

Figure 2:
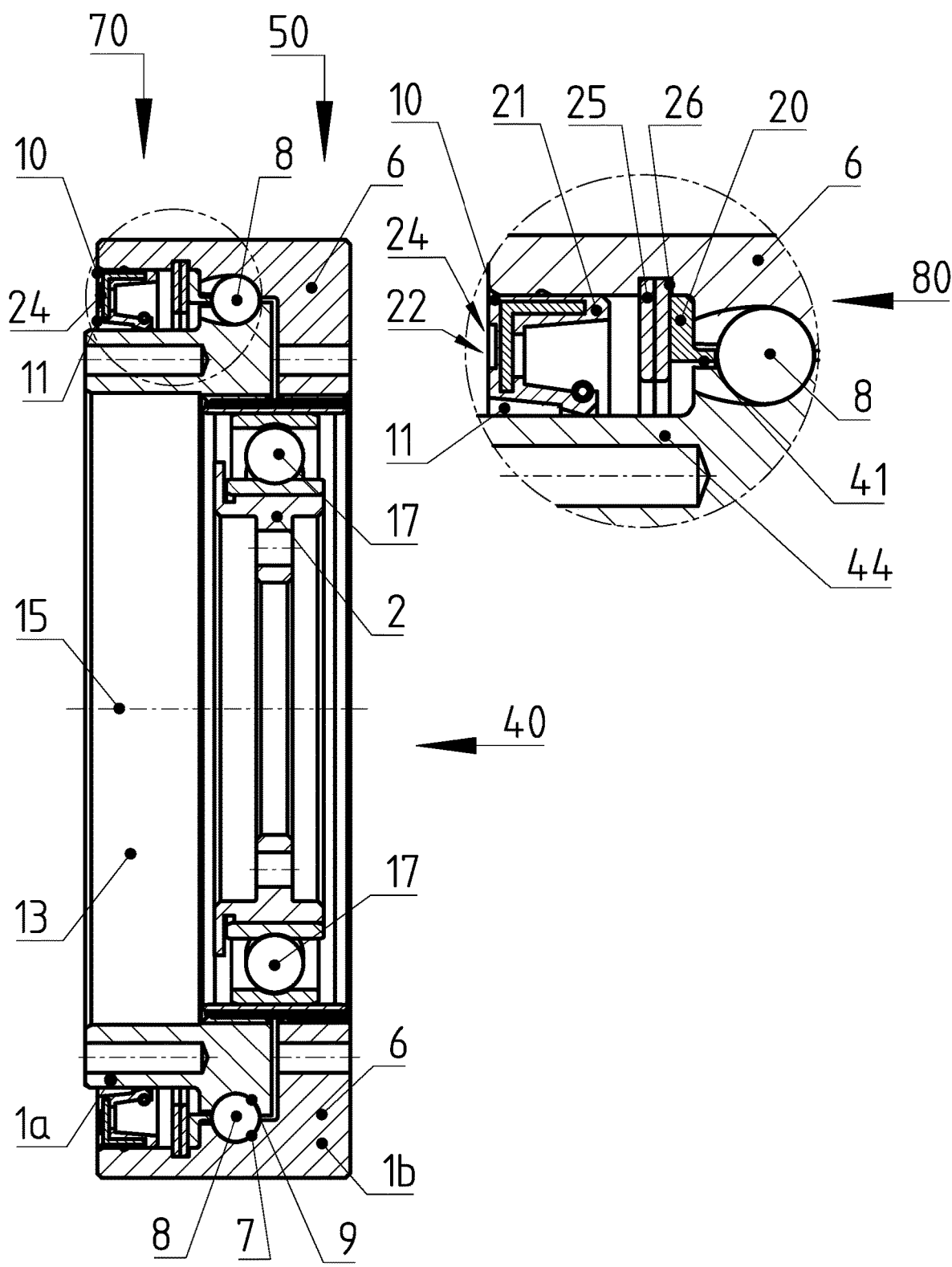
FIG. 2 a second preferred embodiment of a gearbox according to the invention, in a sectional view.
Figure 3:
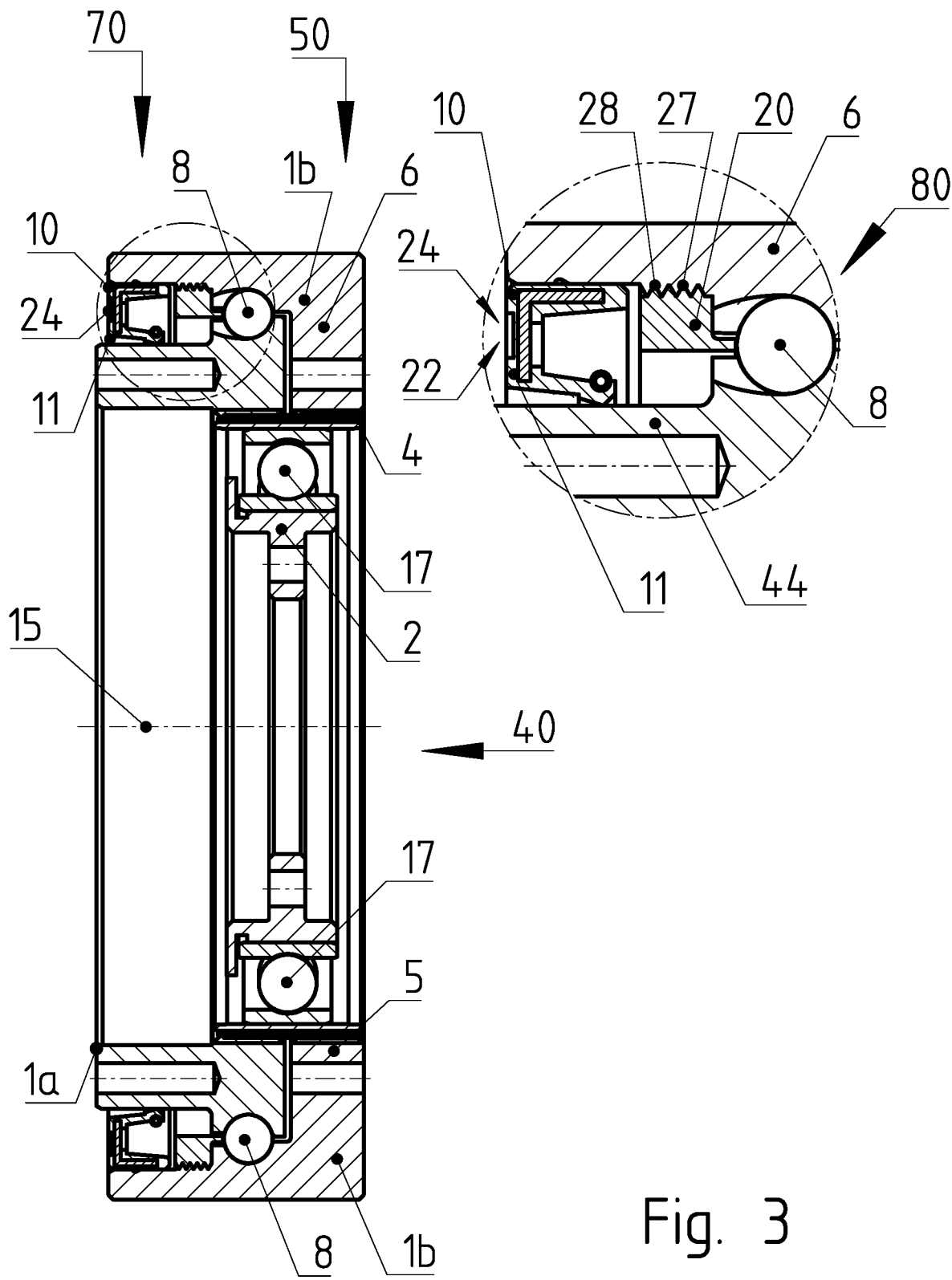
FIG. 3 a third preferred embodiment of a gearbox according to the invention, in a sectional view.
Figure 4:
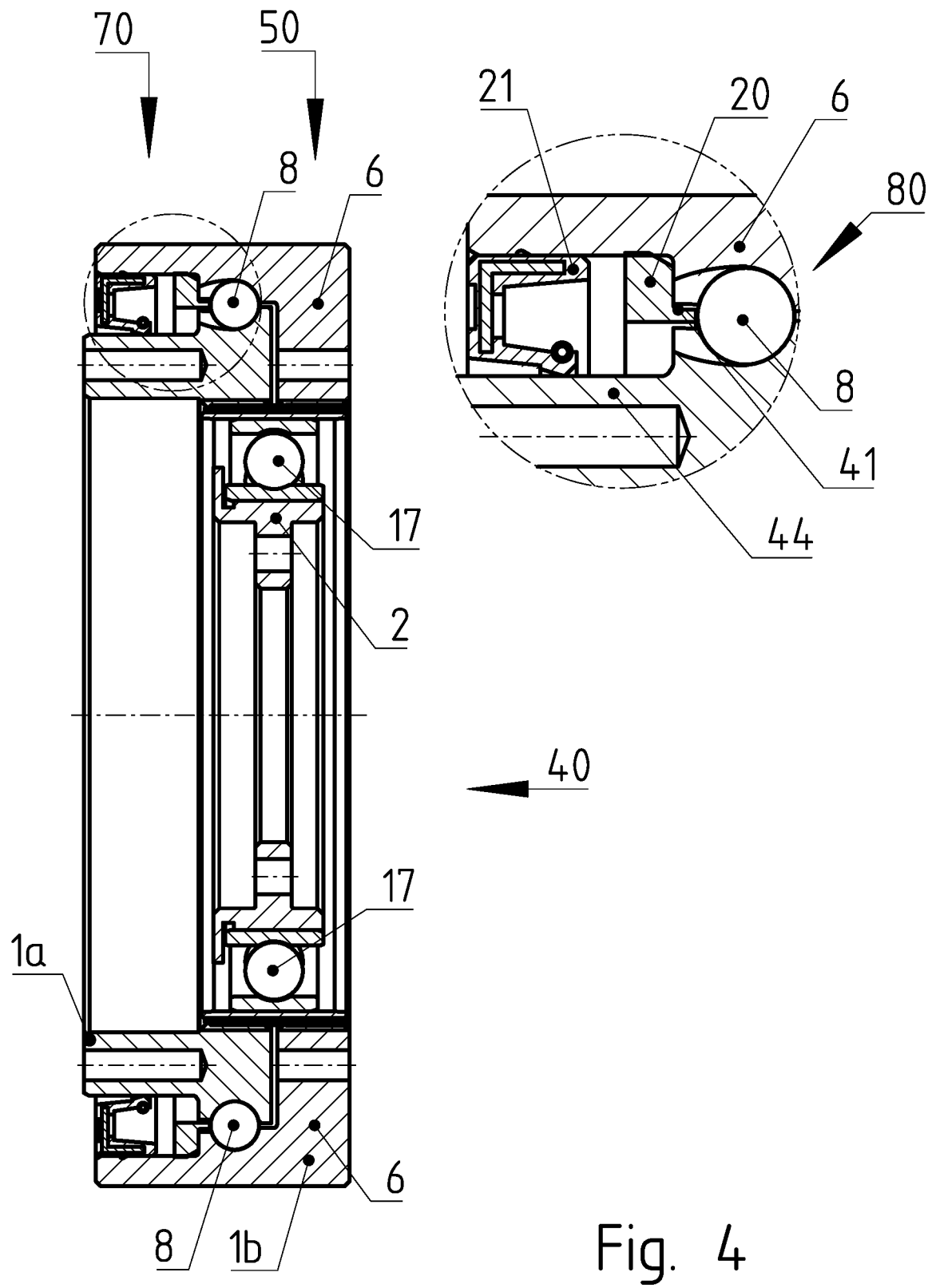
FIG. 4 a fourth preferred embodiment of a gearbox according to the invention, in a sectional view.

The gearboxes 70 shown in FIGS. 2 to 4 differ from each other only regarding the type of configuration of the guide ring 20 or of the receptacles 10, 11 and of the components arranged therein.

FIG. 2 shows another preferred embodiment of a gearbox 70 with a rotary bearing 50 and a strain wave gear 40. In this embodiment, a retaining ring 25 is arranged in the receptacle 10. The retaining ring 25 is arranged in a radial external area in a radial groove 26 in the wheel 6, as a result of which, it is secured radially and axially. It prevents axial movement of the guide ring 20 in the direction of the receptacle opening 22. The guide ring 25 here is preferably made of plastic or else of steel. A rotary shaft seal 21 is likewise present in this embodiment.

Another preferred embodiment of a gearbox 70 with a rotary bearing 50 and a strain wave gear 40 is shown in FIG. 3. In this embodiment, the guide ring 20, preferably made of steel, is configured with a helical shape and has an external thread 27 which engages with a matching internal thread 28 in the wheel 6.

FIG. 4 shows another preferred embodiment of a gearing installation set 70, having a rotary bearing 50 and a strain wave gear 40. In this context, the guide ring 20, which is preferably made of plastic but which can also be made of steel, is axially secured on its outer diameter in the wheel 6 by means of a press fit or interference fit. It is likewise possible to glue the guide ring.

Figure 5:
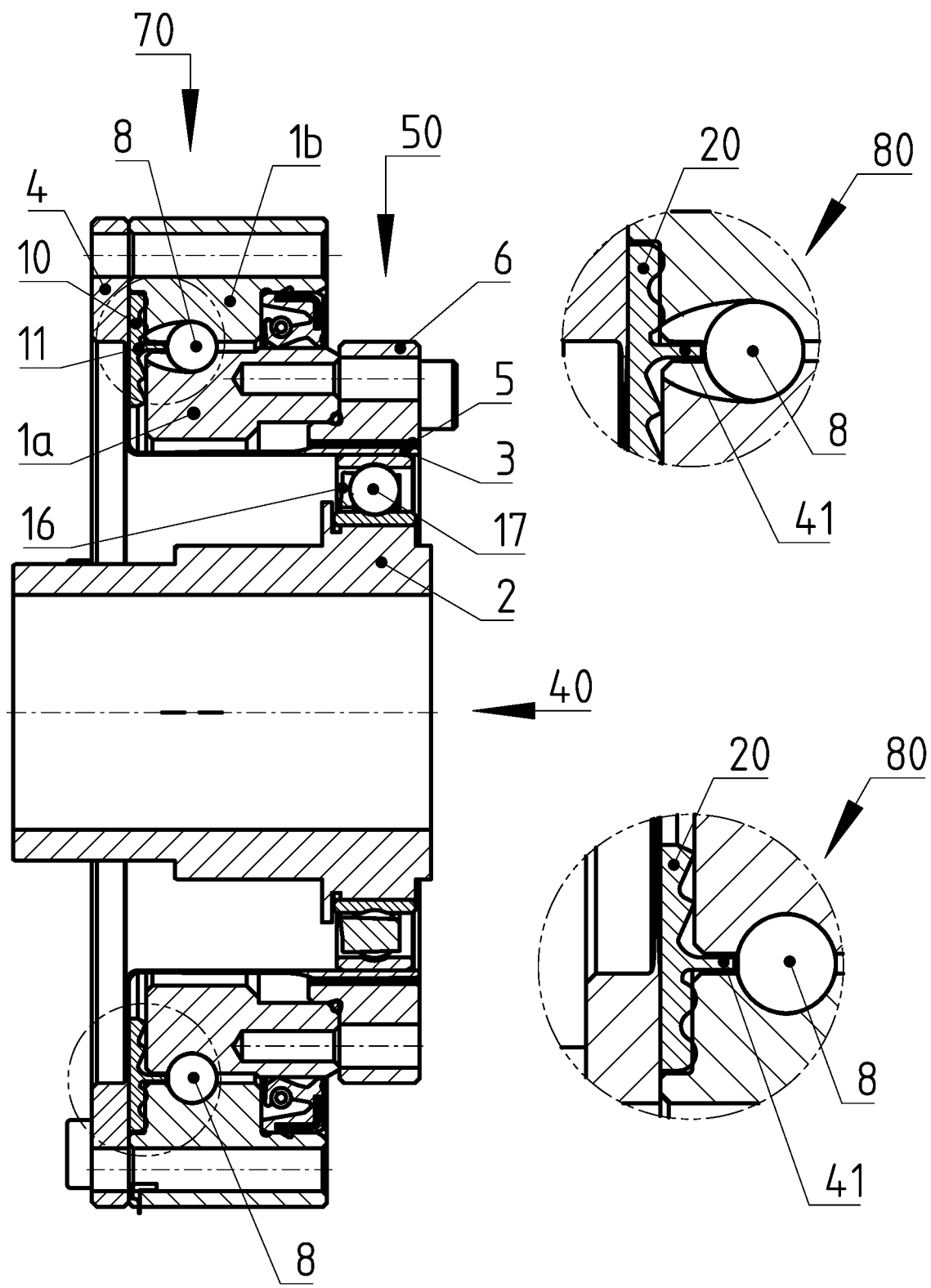
FIG. 5 a fifth preferred embodiment of a gearbox according to the invention, in a sectional view.

FIG. 5 shows another preferred embodiment of a gearbox 70, with a rotary bearing 50 and a strain wave gear 40, having a wheel 6 configured as an internal gearwheel or circular spline which, in the area of its internal teeth 5 overlaps, and is engaged in some places, with the external teeth 3 of a transmission component 4 or flexspline.

The transmission component 4 is non-rotatably joined to an outer bearing ring 1b of a rotary bearing 50, said ring holding the transmission component 4 and the wheel 6 in such a way that they can rotate with respect to each other. An inner bearing ring 1a of the rotary bearing 50 is non-rotatably joined to the circular spline or wheel 6.

The transmission component 4 is elliptically deformed by an elliptical input component 2. By means of its external teeth 3, the elliptically deformed transmission component 4 engages with the opposing areas of the major axis of the ellipse into inner teeth 5 of a wheel 6 configured as a circular spline. In the embodiment described here, the input component 2 is configured as an elliptical wave generator. The elastic transmission component 4 configured as a flexspline is placed onto this input component 2 over a ball bearing 16 containing several balls 17. Due to the elasticity in the area of its external teeth 3, this transmission component 4 is likewise elliptically deformed owing to the elliptical shape of the input component 2.

In this embodiment, the guide ring 20 is configured as an internal seal or flat seal, or else it is integrated therein. The flat seal and the guide ring 20 are configured as one part or in one piece. The guide ring 20 in this embodiment is preferably made of a composite material that preferably consists of elastomer and plastic or steel.

Figure 6:
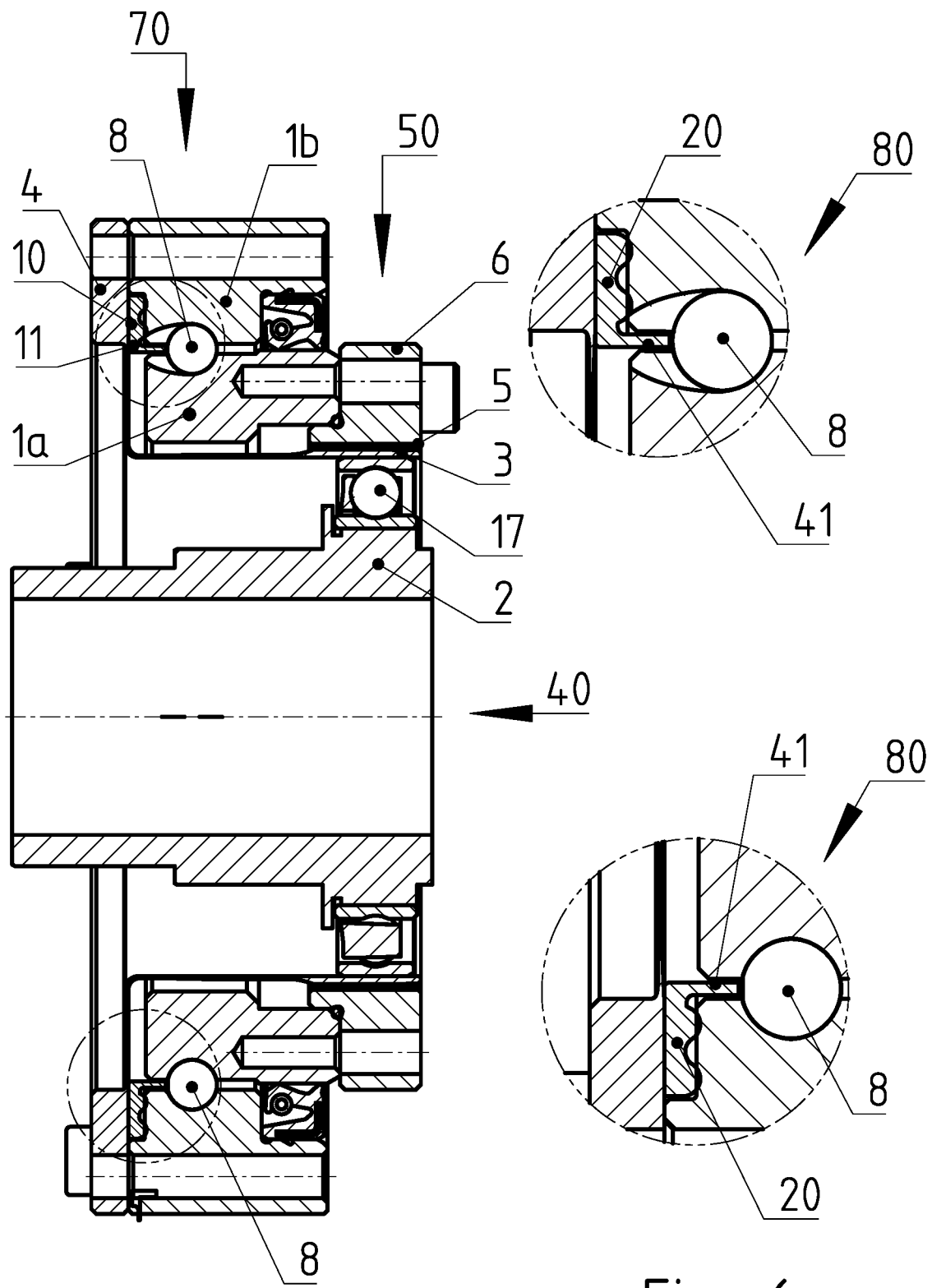
FIG. 6 a sixth preferred embodiment of a gearbox according to the invention, in a sectional view.

Another preferred embodiment of a gearbox 70 with a rotary bearing 50 and a strain wave gear 40 is shown in FIG. 6 which differs from the embodiment shown in FIG. 5 only in terms of the configuration of the guide ring. In this context, only a guide ring 20 without dynamic sealing is provided. The guide ring 20 here can consist purely of a plastic ring or else of a composite material in the form of elastomer and plastic or steel, so that it can also take over the function of a static O-ring between the bearing ring 1b and the transmission component 4.

LIST OF REFERENCE NUMERALS 1a inner bearing ring
1b outer bearing ring
2 input component
3 external teeth
4 transmission component
5 internal teeth
6 wheel
7 bearing surface
8 rolling elements
9 bearing surface
10 receptacle
11 receptacle
13 clutching wheel
15 x-axis
16 ball bearing
17 balls
20 guide ring
21 rotary shaft seal
22 receptacle opening
23 annular gap
24 loading channel
25 retaining ring
26 groove
27 external thread
28 internal thread
40 strain wave gear
41 projection 43 shoulder
44 sealing surface
45 sealing edge
50 rotary bearing
70 gearbox

The invention claimed is:

1. A rotary bearing (50) for harmonic gearing, comprising:
rolling elements (8);
an outer bearing ring (1b) defining a bearing surface (9) and an inner bearing ring (1a) defining a bearing surface (7), with the inner bearing ring (1a) arranged in the outer bearing ring (1b), wherein the inner bearing ring (1a) and the outer bearing ring (1b) are each provided with at least one receptacle (10, 11) through which, when the two receptacles (10, 11) are in a corresponding position with respect to each other, the rolling elements (8) are insertable through a receptacle opening (22) formed by the two receptacles (10, 11) into an anti-friction bearing between the bearing surface (7) of the inner bearing ring (1a) and the bearing surface (9) of the outer bearing ring (1b); and
a guide ring (20) arranged in at least one of the two receptacles (10, 11) between the receptacle opening and the rolling elements (8), said guide ring (20) having an annular projection (41) that runs axially and is configured for contacting the rolling elements (8).

2. The rotary bearing (50) according to claim 1, further comprising a sealing ring arranged in at least one of the two receptacles (10, 11), said sealing ring blocking axial movement of the guide ring (20) in the direction of the receptacle opening (22).

3. The rotary bearing (50) according to claim 1, further comprising a retaining ring (25) arranged in at least one of the two receptacles (10, 11) and configured to block axial movement of the guide ring (20) in the direction of the receptacle opening (22).

4. The rotary bearing (50) according to claim 1, wherein the guide ring (20) is configured in the form of a screw having an external thread (27) that engages with an internal thread (28) formed in the outer bearing ring (1b).

5. The rotary bearing (50) according to claim 1, wherein the guide ring (20) is axially secured to the outer diameter in the outer bearing ring (1b) by a press fit or interference fit.

6. The rotary bearing (50) according to claim 1, wherein the guide ring (20) is made of plastic or steel.

7. The rotary bearing (50) according to claim 1, wherein the guide ring (20) is integrated into a flat seal.

8. The rotary bearing (50) according to claim 1, wherein only the guide ring (20) is arranged in the at least one receptacle (10, 11) without incorporating any separate seal.

9. A gearbox (70), comprising:
a rotary bearing (50) according to claim 1; and
a strain wave gear (40) mounted in the rotary bearing (50), said strain wave gear (40) having an input component (2), an elastic transmission component (4) provided with external teeth (3), and a wheel (6) provided with internal teeth (5), wherein the elastic transmission component (4) when placed onto the input component (2) is elliptically deformed by the input component (2) in such a way that the external teeth (3) of the transmission component (4) engage in the opposing areas of the major axis of the ellipse with the internal teeth (5) of the wheel (6).

10. The gearbox (70) according to claim 9, wherein the wheel (6) forms the outer bearing ring (1b).

11. The gearbox (70) according to claim 9, wherein the inner bearing ring (1a) is configured as a clutching wheel (13) with clutching wheel internal teeth having a same number of teeth as the external teeth (3) of the transmission component (4), and wherein the internal teeth of the clutching wheel (13) are engaged with the external teeth (3) of the transmission component (4).

12. A gearbox, comprising:
a rotary bearing, said rotary bearing comprising rolling elements;
an outer bearing ring defining a bearing surface and an inner bearing ring defining a second bearing surface, with the inner bearing ring arranged in the outer bearing ring, wherein the inner bearing ring and the outer bearing ring are each provided with at least one receptacle through which, when the two receptacles are in a corresponding position with respect to each other, the rolling elements are insertable through a receptacle opening formed by the two receptacles into an anti-friction bearing between the second bearing surface of the inner bearing ring and the bearing surface of the outer bearing ring; and a guide ring arranged in at least one of the two receptacles between the receptacle opening and the rolling elements, said guide ring having an annular projection that runs axially and is configured for contacting the rolling elements; and
a strain wave gear mounted in the rotary bearing, said strain wave gear having an input component, an elastic transmission component provided with external teeth, and a wheel provided with internal teeth, wherein the elastic transmission component when placed onto the input component is elliptically deformed by the input component in such a way that the external teeth of the transmission component engage with the internal teeth of the wheel in the opposing areas of a major axis of an ellipse formed by the elliptically deformed elastic transmission component.

13. The gearbox according to claim 12, wherein the wheel forms the outer bearing ring.

14. The gearbox according to claim 12, wherein the inner bearing ring is configured as a clutching wheel with clutching wheel internal teeth having a same number of teeth as a number of the external teeth of the transmission component, and wherein the internal teeth of the clutching wheel are engaged with the external teeth of the transmission component.

15. The gearbox according to claim 13, wherein the inner bearing ring is configured as a clutching wheel with clutching wheel internal teeth having a same number of teeth as a number of the external teeth of the transmission component, and wherein the internal teeth of the clutching wheel are engaged with the external teeth of the transmission component.

* * * * *